Sept. 5, 1933.                H. N. AULT                1,925,364
                      SAFETY DEVICE FOR WRINGERS
                         Filed June 7, 1932      2 Sheets-Sheet 1
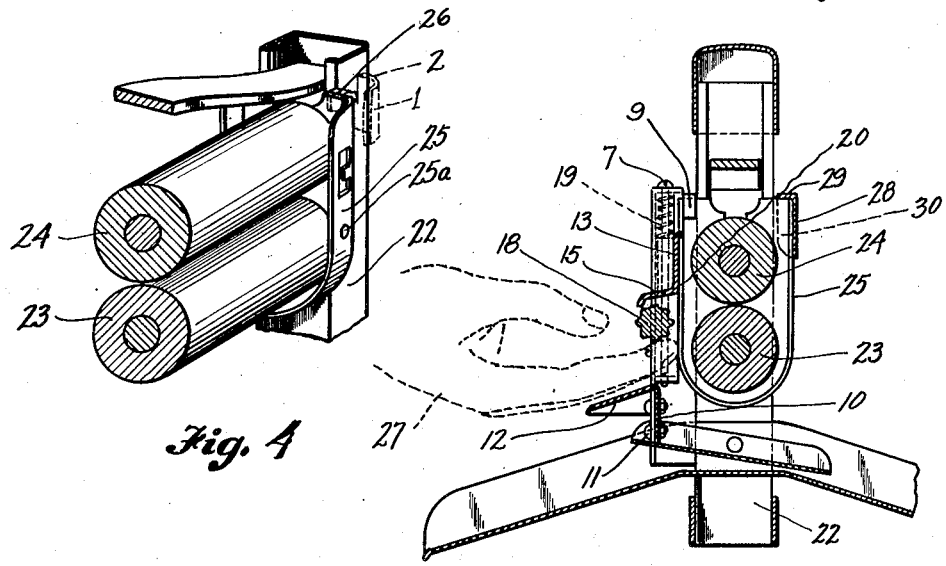
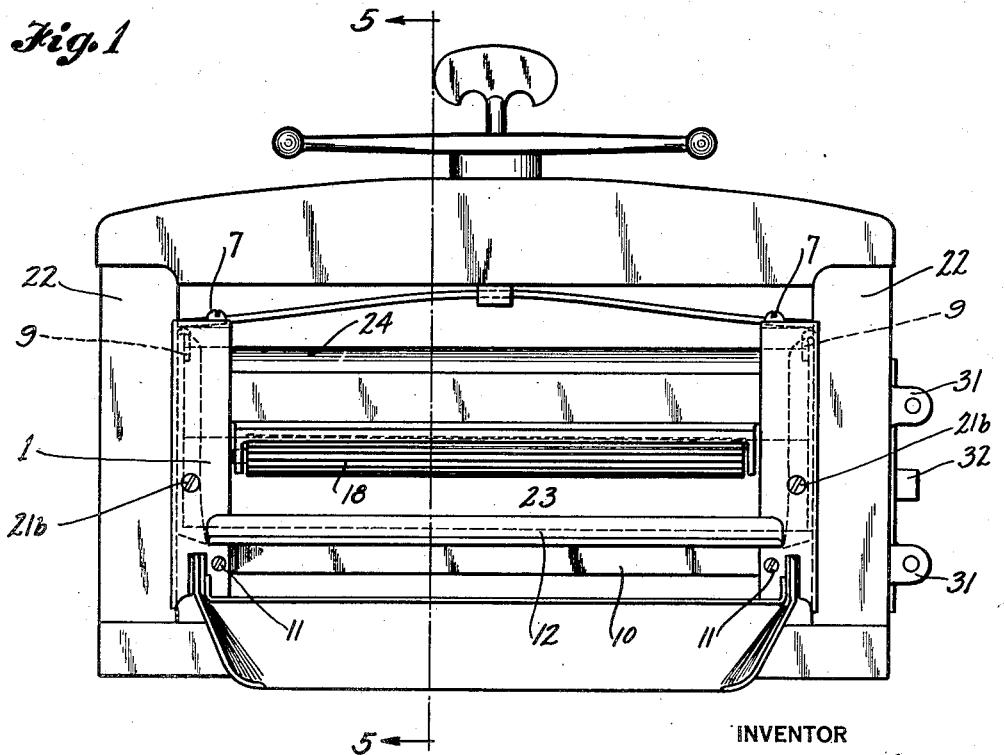
INVENTOR
BY Harvey N. Ault
ATTORNEY Sept. 5, 1933.   H. N. AULT   1,925,364
SAFETY DEVICE FOR WRINGERS
Filed June 7, 1932    2 Sheets-Sheet 2
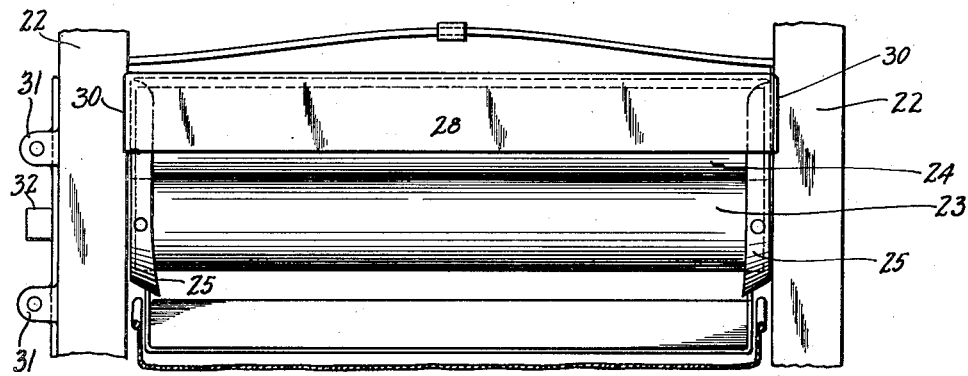
Fig. 7
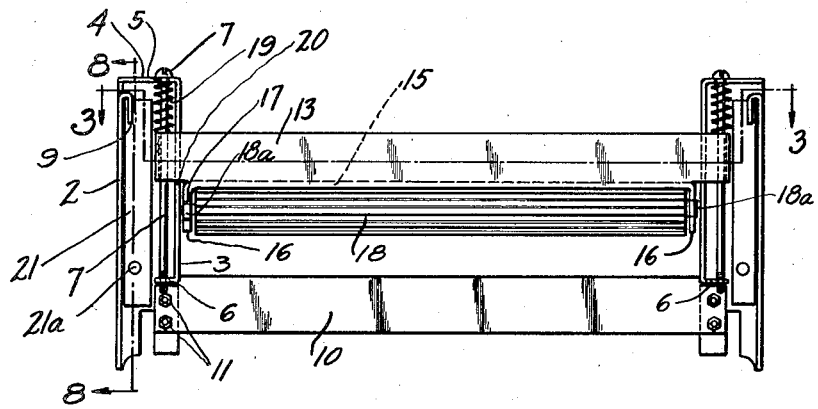
Fig. 2
Fig. 3
Fig. 6
Fig. 8
INVENTOR
BY
ATTORNEY Patented Sept. 5, 1933

1,925,364

UNITED STATES PATENT OFFICE 1,925,364

SAFETY DEVICE FOR WRINGERS

Harvey N. Ault, Seattle, Wash.

Application June 7, 1932. Serial No. 615,892

1 Claim. (Cl. 68—32)

This invention relates to improvements in clothes wringers and has for its principal object to provide a device of this character which includes a safety mechanism whereby the fingers of the operator are not liable to be caught between the wringer rollers. The liability of the fingers of the operator being caught between the wringer rollers exists at all times and often results in severe maiming of the fingers and hands especially in power wringers.

Another important feature of the invention is that the tendency of clothing when passing through the wringer rollers to cling to the upper roller and rewind instead of passing straight on through,—is prevented. My device may be either in the form of an attachment to standard forms of wringers, or it may be built in the wringers themselves during the process of manufacture of the wringers.

I accomplish these and other objects by the peculiar arrangement and combination of the parts as will be more fully hereinafter described in the following specifications, shown in the accompanying drawings and finally pointed out in the appended claim.

In the drawings, Fig. 1 is a front elevation of my device and shows it attached to the wringer.

Fig. 2 is a rear elevation of my device.

Fig. 3 is a section upon the line 3—3 of Fig. 2.

Fig. 4 is a fragmentary view of a wringer showing guard to which my device is attached.

Fig. 5 is a section upon the line 5—5 of Fig. 1.

Fig. 6 is a perspective of the stripper.

Fig. 7 is a rear view of the wringer, showing stripper attached.

Fig. 8 is a section upon the line 8—8 of Fig. 2.

In describing this device it will be understood that it is symmetrical about a vertical center line so that a description of one end will be understood to apply also to the other.

Referring more particularly to the drawings, reference numeral 1 represents a side frame which in general is a U section with the outside leg being wide as shown at 2 and the inside leg narrower as shown at 3, (Fig. 3). The top end of the side frames are bent over so as to form a lug or cover 4, through which are pierced holes 5, (Fig. 2). The lower end of leg 3 is sheared upward from the end section and a portion of it turned over so as to form a lug 6, (Fig. 2). Through the holes 5 of lug 4 is passed a bolt 7, the lower end of which is threaded into tapped holes of lugs 6. The upper ends of the outside legs 2 are sheared down approximately in the center as shown at 8, (Fig. 8), and the outside portion of the leg turned down so as to form a hook 9, as shown more clearly in Fig. 2, the purpose of which will be described later. To each of the two end frames is supported a spacer 10 by means of bolts 11. The top edge of the spacer is bent outward to form a ledge as shown at 12. A section of the spacer with its ledge is more clearly shown in Fig. 5. Slidably mounted on bolt 7 is a member 13, the ends of which are slidably bent around bolt 7 as shown at 14, (Fig. 3). The lower edge of member 13 is bent outward so as to form a ledge 15 which is shown clearly in section in Fig. 5. The ends of ledge 15 are bent downward to form lugs 16 which are perforated as shown at 17. 18 is a corrugated supplemental roller (shown in section in Fig. 5), provided with a pintle 18—a at each of its ends, which are rotatably mounted in the perforated holes 17 of the down turned lugs 16. 19 are coil springs mounted around bolts 7 and have a tendency to urge member 13 with roller 18 downward; the downward movement being limited, however, by a small shoulder 20 on the legs 3 of the end members 1, (Figs. 2, 3, and 5). 21 (Figs. 2, 3, and 3) are spacing blocks secured in the end frames, the purpose of which will be described later. 22 (Fig. 4) shows the end frame of a conventional or standard make wringer, 23 and 24 are the usual rubber rollers and 25 is the usual end guard. This end guard is wider than the end frames 22 and consequently leaves a projecting shoulder at its upper end as shown at 26, and it is to this shoulder which I attach my device. The hooks 9, as shown more clearly in Fig. 2, are hooked over this shoulder. This hook with a small fragment of the end frames of my device is in dotted position in Fig. 1. The proportion and the arrangement of my device are such that the lower edge of supplemental corrugated roller 18 is considerably below the contact line between wringer rollers 23 and 24, and slightly above the center line of the lower roller, which makes it impossible for the hand or fingers to be pulled in between the rollers 23 and 24 when the wringer is in operation. 27 is a dotted outline of a hand and shows where the fingertips will come in contact with the lower roller. If the fingertips should get in far enough so that they come in contact with the lower roller they may of course be easily withdrawn without any danger of the fingertips being drawn in between the main rollers 23 and 24 of the wringer. Due to this the hand of the operator forces the clothing toward the main rollers, but in a plane below the contact point of the main rollers so that the clothing may be caught by the main rollers and passed between them, but the fingers of the operator will not pass along with the clothing between the main rollers and thus cause injury to the hand.

The spacing blocks 21 rest against end guards 25 and help to hold my device in place. 21—*a* are drilled holes in the side frames 1 (Figs. 4 and 8) which register with tapped holes 25—*a* in the end guards 25.

Screws 21—*b* (Fig. 1) may be passed through holes 21—*a* and screwed into holes 25—*a* thus very firmly locking the bottom of my device in place on the wringer.

I have also devised what may be known as a stripper. It is a well known fact that while sending clothes through a wringer they will often times adhere to the rollers and return back or wind up on them. This is eliminated by the device clearly shown in Fig. 6, of which 28 is a flat metallic plate turned over at its upper edge as shown at 29 and the ends bent over as shown at 30. The size of this stripper is such that it will clamp snugly over the shoulder 26 of the end guard 25 (Fig. 4). Figs. 5 and 7 clearly show this stripper in place. 31, (Figs. 1 and 7) indicate the usual brackets perforated as shown, by which the wringer is attached to a washing machine in a well known manner. 32 is a projection of the shaft from the lower roller 23 to which the driving power is attached, as a motor or the like.

While I have shown and described a particular form of embodiment of my invention, I am aware that many minor changes will readily suggest themselves to those skilled in the art without departing from the spirit and scope of my invention. I, therefore, desire to avoid being limited to the particular form which I have hereinabove shown and described. Having described my invention, what I claim as new and desire to protect by Letters Patent is:

An attachment for a clothes wringer having a pair of main rollers and end guards for said rollers said attachment comprising a supplemental roller, roller mounting means for yieldingly mounting the supplemental roller so that its center of rotation is below the line represented by the contact of the said pair of main rollers whereby the clothes to be wrung first pass beneath the supplemental roller thence slightly upward and between the main rollers and hooks carried by said roller mounting means for engagement about said end guards for detachably positioning said roller mounting means.

HARVEY N. AULT.